(12) United States Patent
Hopmann et al.

(10) Patent No.: US 6,578,069 B1
(45) Date of Patent: *Jun. 10, 2003

(54) METHOD, DATA STRUCTURE, AND COMPUTER PROGRAM PRODUCT FOR IDENTIFYING A NETWORK RESOURCE

(75) Inventors: Alexander I. Hopmann, Seattle, WA (US); Rebecca L. Anderson, Redmond, WA (US); Brian J. Deen, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/412,071

(22) Filed: Oct. 4, 1999

(51) Int. Cl.$^7$ ............................................. G06F 12/00
(52) U.S. Cl. ........................ 709/203; 707/203; 707/201
(58) Field of Search ...................... 707/101, 10, 202, 707/201, 8, 203; 714/12, 15, 4; 709/226, 220, 223, 205; 710/302; 713/100, 200, 201; 711/144, 141

(56) References Cited

U.S. PATENT DOCUMENTS

| | | | | |
|---|---|---|---|---|
| 5,560,005 A | * | 9/1996 | Hoover et al. | 707/10 |
| 5,600,834 A | * | 2/1997 | Howard | 707/201 |
| 5,812,773 A | * | 9/1998 | Norin | 709/201 |
| 5,812,793 A | * | 9/1998 | Shakib et al. | 707/201 |
| 5,884,325 A | * | 3/1999 | Bauer et al. | 705/40 |
| 6,049,799 A | * | 4/2000 | Mangat et al. | 370/396 |
| 6,182,117 B1 | * | 1/2001 | Christie et al. | 709/205 |
| 6,256,740 B1 | * | 7/2001 | Muller et al. | 713/201 |

* cited by examiner

Primary Examiner—Meng-Al T. An
Assistant Examiner—Kenny Lin
(74) Attorney, Agent, or Firm—Workman, Nydegger & Seeley

(57) ABSTRACT

Techniques are presented for allowing clients and servers in a computer network executing the WebDAV protocol to identify a specific version of a specific resource a specific version using a resource tag. The resource can be identified even though it has been changed at a server or at an off line local cache of a client that is disconnected from the network and then later re connected to the network for uploading. Also, a resource UID is presented that will not change despite changes to the URL or the resource tag of the resource. Each resource UID of each resource can be cached locally at a client and can be stored at network server in an index. The index allows the resource to be identified uniquely across a collection in a database at a server, across a database at the server, across the entire server, or across all servers in the network.

26 Claims, 9 Drawing Sheets

>>>>request

PROPFIND /exchange/user0/inbox/ HTTP/1.1
Host: davbuddy1
Content-Type: text/xml
Depth: 1
Content-Length: 334
Authorization: Basic dXNlcjA6dXNlcjA=

<?xml version="1.0" encoding="utf-8"?>
<a:propfind xmlns:a="DAV:">
<a:prop xmlns:r="http://schemas.microsoft.com/repl/">
<r:uid/>
<r:resourcetag/>
</a:prop>
</a:propfind>

<<<<response

HTTP/1.1 207 Multi-Status
Server: Microsoft-IIS/5.0
Date: Tue, 21 Sep 1999 21:58:31 GMT
Content-Type: text/xml
Accept-Ranges: rows
Transfer-Encoding: chunked 211e
<?xml version="1.0"?>
<a:multistatus xmlns:b="urn:uuid:c2f41010-65b3-11d1-a29f-00aa00c14882/"
xmlns:c="xml:" xmlns:e="urn:schemas-microsoft-com:office:office"
xmlns:d="http://schemas.microsoft.com/repl/" xmlns:a="DAV:">
 <a:response>
  <a:href>http://davbuddy1/exchange/user0/Inbox/</a:href>
  <a:propstat>
   <a:status>HTTP/1.1 200 OK</a:status>
   <a:prop>
    <d:uid>rid:c75196cf3d84174bbc89af0f7d91d5b7000000000372</d:uid>

FIG. 4A

```
<d:resourcetag>rt:c75196cf3d84174bbc89af0f7d91d5b7000000000372c75196cf3d84
174bbc89af0f7d91d5b700000000c467</d:resourcetag>
    </a:prop>
   </a:propstat>
  </a:response>
  <a:response>
   <a:href>http://davbuddy1/exchange/user0/Inbox/http-microsoft-xmlhttp.doc</a:href>
   <a:propstat>
    <a:status>HTTP/1.1 200 OK</a:status>
    <a:prop>
     <d:uid>rid:c75196cf3d84174bbc89af0f7d91d5B7000000001abd</d:uid>

<d:resourcetag>rt:c75196cf3d84174bbc89af0f7d91d5b7000000001abdc75196cf3d84
174bbc89af0f7d91d5b7000000006e73</d:resourcetag>
    </a:prop>
   </a:propstat>
  </a:response>
  <a:response>

<a:href>http://davbuddy1/exchange/user0/Inbox/RE%253A%20More%20mail.EML</a:href>
    <a:propstat>
     <a:status>HTTP/1.1 200 OK</a:status>
     <a:prop>
      <d:uid>rid:c75196cf3d84174bbc89af0f7d91d5b7000000001ab5</d:uid>

<d:resourcetag>rt:c75196cf3d84174bbc89af0f7d91d5b7000000001ab5c75196cf3d84
174bbc89af0f7d91d5b70000000034e2</d:resourcetag>
    </a:prop>
   </a:propstat>
  </a:response>
  <a:response>
   <a:href>http://davbuddy1/exchange/user0/Inbox/More%20mail.EML</a:href>
   <a:propstat>
    <a:status>HTTP/1.1 200 OK</a:status>
    <a:prop>
     <d:uid>rid:c75196cf3d84174bbc89af0f7d91d5b7000000001ab2</d:uid>

<d:resourcetag>rt:c75196cf3d84174bbc89af0f7d91d5b7000000001ab2c75196cf3d84
174bbc89af0f7d91d5b70000000034b4</d:resourcetag>
    </a:prop>
   </a:propstat>
  </a:response>
  <a:response>
   <a:href>http://davbuddy1/exchange/user0/Inbox/Priority/</a:href>
   <a:propstat>
    <a:status>HTTP/1.1 200 OK</a:status>
    <a:prop>
     <d:uid>rid:c75196cf3d84174bbc89af0f7d91d5b7000000001aaa</d:uid>
```

FIG. 4B

```
<d:resourcetag>rt:c75196cf3d84174bbc89af0f7d91d5b7000000001aaac75196cf3d84
174bbc89af0f7d91d5b700000000b8e0</d:resourcetag>
    </a:prop>
   </a:propstat>
  </a:response>
</a:multistatus>
0
```

FIG. 4C

```
>>Request
GET /doccoll/docA HTTP/1.1

>>Response
HTTP/1.1 200 OK
ResourceTag: <doc-02>
Content-type: text/plain
Content-length: {insert length here}

This is the content of text document docA.
```

FIG. 5A

```
>>Request
PROPFIND /docs/docA HTTP/1.1
Host: www.company.com
Depth: 1
If: (<doc-02>)
Content-type: text/xml
Content-length: {insert length here}

<?xml version="1.0"?>
<D:propfind xmlns:D="DAV:"

xmlns:R="http://schemas.microsoft.com/repl/">
   <D:props>
      <D:displayname/>
   </D:props>
</D:propfind>

>>Response
HTTP/1.1 207 Multi-Status
Content-type: text/xml
Content-length: {insert length here}

<?xml version="1.0"?>
<D:multistatus xmlns:D='DAV: '
     xmlns:M="urn:schemas:mail"
     xmlns:R='http://schemas.microsoft.com/repl/'>
   <D:response>

<D:href>http://www.company.com/docs/docA</D:href>
     <D:propstat>
          <D:status>HTTP/1.1 200 OK</D:status>
          <D:prop>
             <D:displayname>Document A</D:displayname>
          </D:prop>
     </D:propstat>
   </D:response>
</D:multistatus>
```

FIG. 5B

```
>>>> request
GET /exchange/user0/Inbox/More%20mail.EML HTTP/1.1
Host: davbuddy1
Translate: f
Content-Length: 0
Authorization: Basic dXNlcjA6dXNlcjA=

<<<< response
HTTP/1.1 200 OK
Server: Microsoft-IIS/5.0
Date: Tue, 21 Sep 1999 22:02:59 GMT
Content-Type: message/rfc822
Content-Length: 862
ETag: "c75196cf3d84174bbc89af0f7d91d5b70000000034b4"
Last-Modified: Fri, 27 Aug 1999 21:04:40 GMT
Accept-Ranges: bytes
ResourceTag: <rt:c75196cf3d84174bbc89af0f7d91d5b7000000001ab2c75196cf3d84174bbc89af0f7d
91d5b70000000034b4>

Thread-Index: Ab7wz8Z1STCW0HESTQSpygLMUwKpzw==
content-class: urn:content-classes:message
From: "user0" <user0@davdom1.extest.microsoft.com>
To: "user0" <user0@davdom1.extest.microsoft.com>
Subject: More mail
Date: Fri, 27 Aug 1999 14:04:39 -0700
Message-ID: <C75196CF3D84174BBC89AF0F7D91D5B707F4@DAVBUDDY1.davdom1.extest.microsoft.c
om>
MIME-Version: 1.0
Content-Type: text/html;
charset="utf-8"
Content-Transfer-Encoding: base64
X-MimeOLE: Produced By Microsoft MimeOLE V5.00.2919.5600
X-MS-Has-Attach:
X-MS-TNEF-Correlator:
Thread-Topic: More mail PCFET0NUWVBFIEhUTUwgUFVCTEIDICItLy9XM0MvL0RURCBIVE1MIDQuMCBUcmFuc2l0aW9uYW
wvL0VOIj48SFRNTD48SEVBRD48TUVUQSBIVFRQLUVRVUlWPSJDb250ZW50LVR5cGUiIENPTIRF
TlQ9InRleHQvaHRtbDsgY2hhcnNldD11dGYtOCI+PC9IRUFEPjxCT0RZPjxESVY+VGhpcyBpcy
BjcmVhdGluZyBtb3JlIG1haWwgaGVyZS48L0RJVj48L0JPRFk+PC9IVE1MPg==
```

FIG. 6

```
GET /exchange/user0/inbox/?urn=rid:c75196cf3d84174bbc89af0f7d91d5b7000000001ab5
HTTP/1.1
Host: davbuddy1
```

FIG. 7A

```
PROPFIND /exchange/user0/inbox/?urn=rid:c75196cf3d84174bbc89af0f7d91d5b7000000001ab5
HTTP/1.1
Host: davbuddy1
Content-Type: text/xml
Depth: 0
Content-Length: 334
```

FIG. 7B

METHOD, DATA STRUCTURE, AND COMPUTER PROGRAM PRODUCT FOR IDENTIFYING A NETWORK RESOURCE

BACKGROUND OF THE INVENTION

1. The Field of the Invention

The present invention relates to methods and data structures for identification of a resource that is kept both at a server in a network and in a local cache at a client in the network, where the client can be disconnected from the network, the client can work off line with its local cache, and the client can then be reconnected to the network. The invention makes the identification of the resource possible after the resource has been changed during the period when the client was disconnected from the network. The identification of the resource enables the client to maintain a current version of the resource in the client's cache prior to disconnecting from and after reconnecting to the network.

2. The Prior State of the Art

With the advent of the personal computer as the standard information tool, individuals everywhere at anytime need access to information. As such, the accessing and sharing of up-to-the-minute information by multiple parties has become increasingly vital to businesses and individuals who operate as users in a computer network environment of clients accessing resources stored on servers. Users who need portable computing, such as is available through the use of a laptop PC, require that the laptop function as a client in a network that can be frequently connected to and disconnected from the network. These users can access and share up-to-the-minute information using World Wide Web Distributed authoring and Versioning (WebDAV) which is an extension to HTTP/1.1 using XML elements. In a network, WebDAV allows clients to perform remote web content authoring operations to create, remove, alter, and query information about resources, such as Web pages, documents, and e-mail. Examples of resource information available in WebDAV include authorship and creation date. The WebDAV specifications are proposed to be written in eXtensible Mark-up Language (XML), which provide a robust tool for specifying distributed authoring and versioning.

With the increasing use of the Internet for distributed authoring and versioning, a need for standardization has been realized in WebDAV as an extension to the Hypertext Transfer Protocol—HTTP/1.1 as defined in RFC 2068. The WebDAV has been documented in RFC 2518 and in RFC 2291. RFC 2068, RFC 2518, and RFC 2291, also referenced herein as the currently published HTTP and WebDAV drafts, are incorporated herein by reference.

Various weakness of network servers running the WebDAV protocol exist in its current interoperable implementation standard. One such weakness is the server's inability to identify a specific version of a specific resource. This disability is particularly problematic when a user alters a resource after disconnecting its respective client from the network. When the client is again connected to the network, the network is often unable to identify the resource that the client. A further weakness presents itself when a resource is changes on a server when a client is disconnected from the network. After reconnecting the client to a server in the network, the server is unable to identify the client's uploaded resource.

What is needed is a method and data structure that allows for identification of a specific version of a specific resource, even though a user creates, alters, or removes the resource after disconnecting its respective client from the network and then reconnecting the client for the purpose of uploading the changed version of the resource. What is also needed is a method and data structure that provides a static and unique identifier for a network resource that does not change even when a resource at a server has its file name changed, or the resource is deleted from the server and its file name is re-used for another resource.

SUMMARY OF THE INVENTION

The present invention provides methods and data structures for identifying a specific version of a specific resource, even though the resource is changed at a server or off line in a local cache of a client while the client is disconnected from the network. When the client is again connected to the network, the server is able to identify the changed version of the resource that the client wishes to upload or download. In this circumstance the present invention allows a client, prior to disconnection from the network, to download a copy of the resource and its respective "resource tag" representing a specific version of a specific resource. Essentially, the resource tag includes a resource identifier and a corresponding version thereof. Both resource and resource tag are locally cached at the client prior to the disconnection of the client from the network. The cache remains available to the user after the client is disconnected from the network. While this client is disconnected, the resource stored at the server can be modified by other network clients, in which case the server updates the resource tag of the modified resource. Similarly, the user of the client can change the copy of the resource in the client's cache. When the client again connects to the network, the client can upload the changed version of the resource from its cache to the server. In this case, the server stores the resource and returns a new resource tag to the client for local caching, and the client need not download the resource. Alternatively, if the client connects to the network and uploads its cached resource tag to the server, the server may then compare the resource tag stored at the server to the uploaded resource tag to determine if the server has stored a different version of the resource. In this case, the server responds by downloading to the client changes to the resource along with a resource tag that represents the server's version of the resource. Implementation of the present invention allows for synchronized versions of the resource at the client and the server in the foregoing two scenarios.

The present invention also provides methods and data structures that provide a unique identifier of a resource, referred to herein as the resource UID. The resource UID will not change despite changes to the URL or the resource tag of the resource. When a resource at a server has its file name changed, or the resource is deleted from the server and its file name is re-used for another resource, in this circumstance a client reconnecting to the network can request information about the resource with the resource UID that it had previously downloaded and the present invention will enable the server to identify and process the client's request regarding the resource. Each resource UID of each resource can be cached locally at a client and can be stored at network server in an index. The index allows the resource to be identified uniquely across a collection in a database at a server, across a database at the server, across the entire server, or across all servers in the network.

Advantageously, the methods and data structures allow the same client to be connected to the same server, or the same client can be connected to different servers because the data is replicated among the servers. This allows the client to synchronize with any server and symmetrical information between the client and the server can be obtained. Thus, a client can be synchronized with any server from an arbitrary set of servers that have the same information replicated. Additionally, it will be understood that the methods and data structures can be used with any number of clients and servers any desired configuration.

Additional advantages of the invention will be set forth in the description which follows, and in part will be obvious from the description, or may be learned by the practice of the invention. The advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 4A through 4C illustrate a WebDAV request from a client using a PROPFIND method and a corresponding response from a server, and particularly show the use of a resource UID in the response from the server;

FIG. 5A illustrates a WebDAV request from a client using a GET method and a corresponding response from a server;

FIG. 5B illustrates a WebDAV request from a client using a PROPFIND method and a corresponding response from a server;

FIG. 6 illustrates a WebDAV request from a client using a PROPFIND method and a corresponding response from a server;

FIGS. 7A and 7B illustrate, respectively, a WebDAV requests from a client using a GET method and a WebDAV request from a client using a PROPFIND method.

DETAILED DESCRIPTION OF THE PREFERRED EMBODIMENTS

The invention is described below by using diagrams to illustrate either the structure or processing of embodiments used to implement the methods and data structures of the present invention. Using the diagrams in this manner to present the invention should not be construed as limiting of its scope. The present invention contemplates methods and data structures for identifying a network resource. The embodiments[]of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
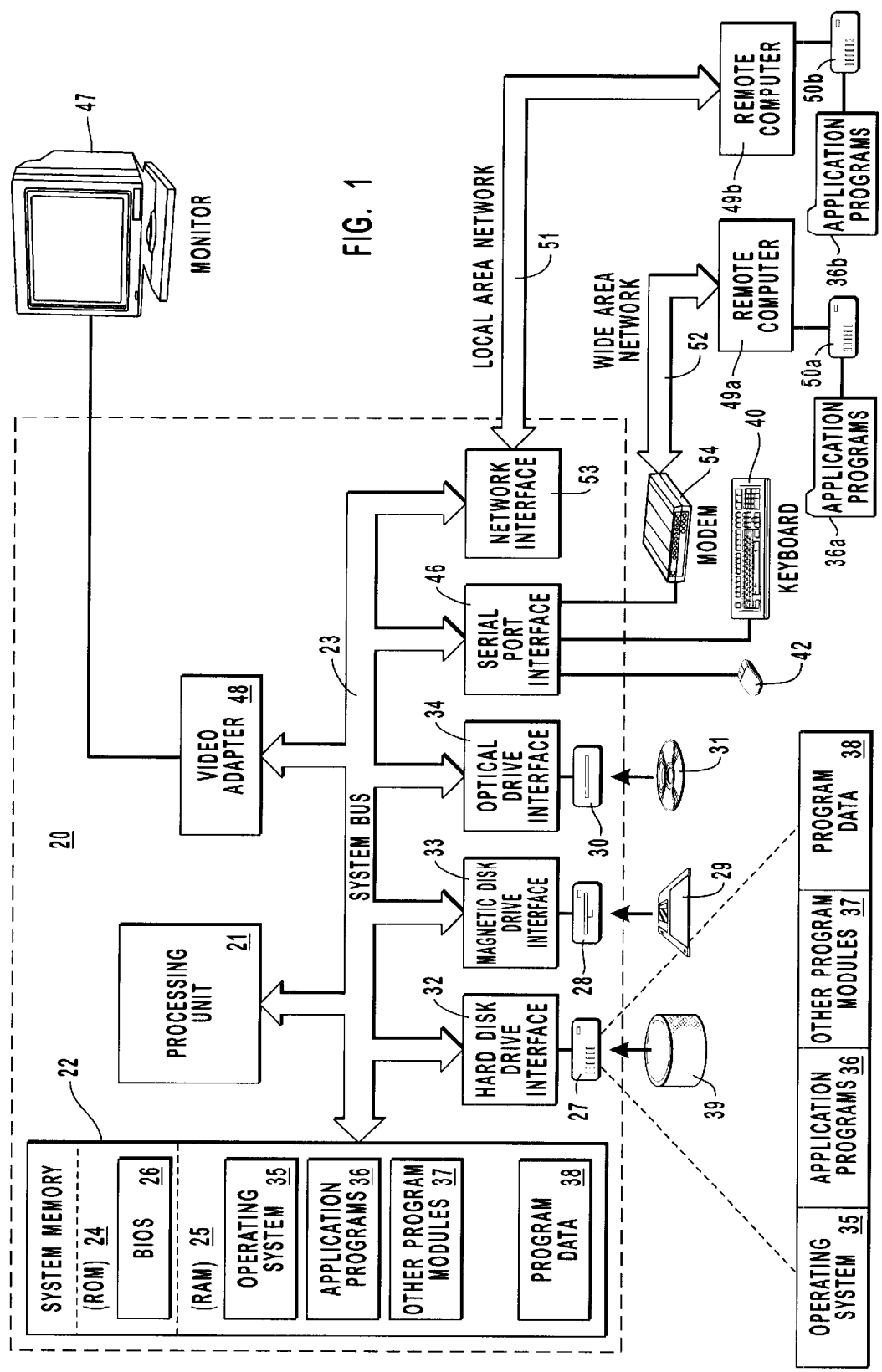
FIG. 1 illustrates an exemplary system that provides a suitable operating environment for the present invention.

FIG. 1 and the following discussion are intended to provide a brief, general description of a suitable computing environment in which the invention ,may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26., containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically includes many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figure 2:
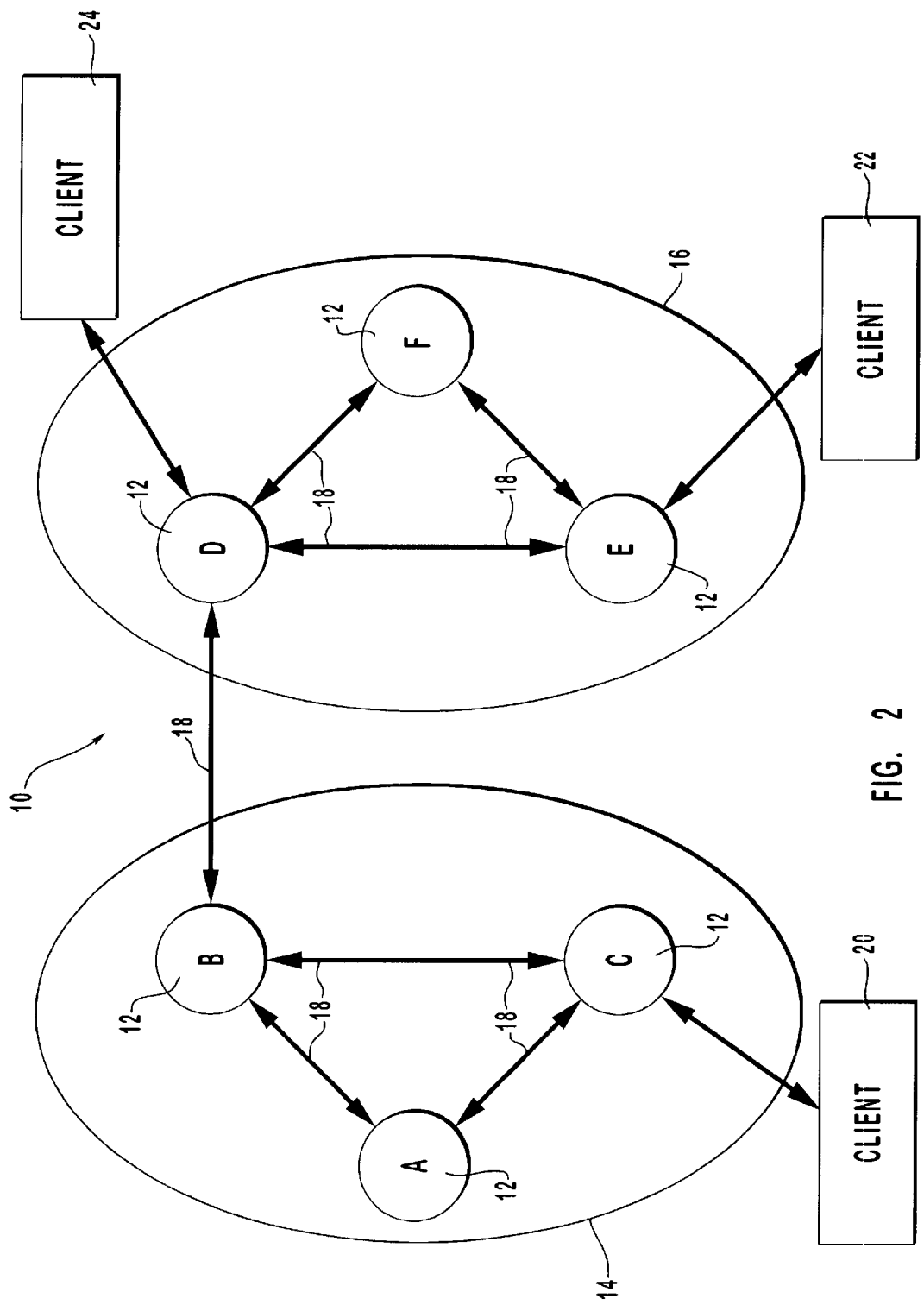
FIG. 2 is a diagram illustrating a network including a plurality of servers in two interconnected sites, and also illustrates a plurality of clients that can alternatively be disconnected from and connected to one of the servers in the network.

Turning now to FIG. 2, an example network is shown generally as 10. Examples applying the present invention to such a context should be considered only illustrative and not limiting of the scope of this invention. Network 10 comprises a plurality of servers 12 labeled A–F in FIG. 2. Servers 12 represent a location in network 10 where a copy of a resource may reside. Servers 12 may be any type of general or specialized computer, such as a server, desk top, laptop, or other computers. In general, however, servers 12 typically comprise computers that are relatively stationary so as to maintain a relatively fixed enterprise topology.

In network 10, servers 12 may be grouped into "sites." A site is typically a plurality of servers with relatively similar costs to access data. Servers within a site are generally, but not necessarily, located in a relatively localized geographic area and have high speed connectivity between nodes, such as, for example, Local Area Network (LAN) connections. The cost to access data between sites is typically much greater than the cost to access data within a site. Site groupings are typically assigned by a network administrator. FIG. 2 illustrates two sites, designated 14 consisting of servers seen at A, B, and C, and 16 consisting of servers D, E, and F.

Within a network, servers are connected by physical network connections. In FIG. 2, the physical network connections 18 are illustrated by solid arrows. Servers 12 may be connected in a variety of network topology configurations. In the network illustrated in FIG. 2, each site is fully connected with a single physical connection between the two sites. The specific type of network topology supported by a particular network will be dependent upon the type of network used. Although the present invention may be utilized with any network, one suitable type of network is presented in co-pending U.S. patent application Ser. No. 08/758,739, U.S. Pat. No. 6,202,085, entitled "SYSTEM AND METHOD FOR INCREMENTAL CHANGE SYNCHRONIZATION BETWEEN MULTIPLE COPIES OF DATA", which is incorporated herein by reference. The foregoing reference discloses techniques for the replication of a resource among servers in a network and is furthermore contemplated as being useful in implementations with the inventive techniques disclosed in the present application.

Several applications are related to the present application, each of which:

(i) has been filed simultaneously with the present application;

(ii) is assigned to the same assignee as the present application;

(iii) disclose techniques for the communication and synchronization of resources between clients and servers in a network environment;

(iv) disclose techniques that are contemplated as being useful in implementations with the inventive techniques disclosed in the present application; and (v) are incorporated herein by reference, as follows:

(a) Method, Computer Readable Medium, and System For Monitoring The State of a Collection of Resources, U.S. patent application Ser. No. 09/412,739, filed on Oct. 4, 1999, which discloses techniques for the creation and use of a token that represents the current state of a collection of resources;

(b) Systems and Methods for Detecting and Resolving Resource Conflicts, U.S. patent application Ser. No. 09/412,738, filed on Oct. 4, 1999, which discloses techniques for detecting and resolving conflicts when different independent changes are made to a single resource; and (c) Method and System for Supporting Off-Line Mode of Operation and Synchronization, U.S. patent application Ser. No. 09/412,766, filed on Oct. 4, 1999, which discloses techniques for replicating the content of a resource between a server and a client and for caching at a client and keeping track of resources that have been retrieved by a client independent of the replication of resources between clients and servers.

In FIG. 2, systems that are not integral parts of network 10 are illustrated by clients 20, 22, and 24. Clients 20, 22, and 24 each have a local store or cache from which resources can be uploaded to a server on network 10, and to which resources can be downloaded to a server on network 10. A client is intended to be a program operating on a data processing mechanism such as a personal computer (PC), where the PC can alternatively be disconnected from and reconnected to network 10. As an example, client 20 may represent a mobile system such as a laptop that may connect to various points in the network depending on where the laptop is located when it is accessing the network. For example, FIG. 2 illustrates client 20 connected to server C. If client 20 is a laptop, then the next time it connects to the network, it may connect to a completely different server. Requiring such a system to become an integral part of the network and to be configured as a standard server may create problems in network administration.

In many instances, the servers must be aware of the particular network topologies so that messages can be routed to appropriate servers. In other instances, servers are assigned cost functions based on the particular site they belong to. If any aspect of the servers is dependent upon the network topology as, for example, in the case of routing or assigning cost functions, then making a mobile system an integral part of the network may create administrative burdens for the network administrator. It is much more desirable to reduce or eliminate the need for a network administrator to intervene in the network configuration when a mobile system connects to a different server. The present invention addresses this need.

In a preferred embodiment, the present invention is implemented to be compatible with HTTP protocol. This provides the advantages of being able to operate across the Internet. Other advantages include support for firewalls, the availability of code libraries, and support for XML. For instance, a client can connect to a network that has Internet access and connect to a different network through the firewall of the second network. XML provides the ability to include commands and elements that are simply ignored by servers that do not understand them, while being executed by those servers that support replication.

A basic principle of the present invention is that every resource has a resource tag associated with it. As such, the resource tag identifies not just a specific resource but also a specific version of a specific resource. Stated otherwise, a resource tag only identifies one version of one resource at one moment in time. In general, a resource tag can be a token generated by the server that represents the state of a DAV resource that is processed in the WebDAV protocol. The value of this property is a URI. Every replicated resource has a resource tag associated with it that reflects the current state of that particular resource. Every time a resource's properties or contents change the inventive resource tag associated with the particular resource is updated by a server on the network. Thus, when a client uploads to a server a resource tag and its corresponding particular version of the particular resource that is stored at the server, the server can "overturn the resource tag". Such an overturning of the resource tag in effect means that the server also stores the uploaded resource tag. By allowing both server and client in this scenario to store the same resource tag, the client does not have to re-download the same resource that it just uploaded to the sever, thus minimizing the network traffic in terms of both time and transreceived data.

If the client chooses to include the resource tag of an uploaded resource in the request, the server can perform conflict detection between the uploaded resource tag and the resource tag stored at the server. Once a conflict is detected by the server, the server can attempt to resolve the conflict, with one of several outcomes. One such outcome is that the determined conflict between the resource tags is a trivial conflict that can be overlooked. Alternatively, the server can also determine that the conflict is severe and that the server must respond with a diagnostic downloaded to the client that requires the client or its user to resolve the severe conflict.

In application, a client uploads a request to a server that specifies the resource tag of a particular version of a particular resource that the client wants to download the properties and/or the content thereof. The server, after verifying that it stores a copy of the requested version of the requested resource, then proceeds to download to the client the requested the properties and/or the content of the requested resource.

The inventive use of the resource tag in the method and dater structure proposed herein is such that a resource need not be identifiable outside of a collection in which it is logically resides, but need only be identified within the collection. The resource tag so employed assures that resources are already identified in a collection in a database of a server with a number that is unique and specific within the collection going forward through time and always increasing and never repeats, thus avoiding problems from erroneous file names due to reused file names, as well as problems from deleted and created resources having the same file name. The resource tag thus can be used as the identifier of the version of the resource.

The format of the resource tag is a binary string that functions as a unique identifier for a specific version of a specific item. In a simple form, the resource tag can be a file name combined with a version number of the resource. A more complex format of the resource tag is a described below. The client can use the resource tag in detecting a conflict between the version of the resource stored at the client and the version of the resource stored at the server, although the client in some circumstances can use the resource tag to resolve such a conflict.

Another inventive technique for identifying a particular resource is a resource Unique Identifier, referred to herein as a resource UID. The resource UID is a property of a resource that differs from both the URL and the resource tag. While the resource tag will be changed by a server each time the respective resource is changed on the server, the resource UID will not change across the lifetime of the resource. Similarly, when the contents of a resource at a server changes, usually the URL of the resource stays the same, the resource tag is changed, but the resource UID will not be changed.

The resource UID is useful in a number of circumstances. One such example is where a client requests a download of a particular resource that is stored at a server. Once downloaded, the client then stores the resource and its corresponding resource UID in its local cache. Next, the resource is deleted at the server by some other client. The server then gives the name of the deleted resource to another resource. The client then makes a request to the server by sending its previously downloaded resource UID iii its local cache. The server understands the uploaded resource UID from the client and can respond by sending the new resource UID of the new resource that has the same name as the client's previously stored resource. Once the new resource UID has been downloaded to the client, the client can perform a compare operation upon its cached resource UID and the downloaded new resource UID. This compare operation at the client will inform the client that the resource that is stored at the server is not the same resource as the resource that the client has locally stored. Once the client has detected this conflict, the client can then optionally upload a request to the server bearing the new resource UID so that the server can then respond by downloading the requested new resource.

Another use of the resource UID relates to a scenario in which a client creates a new resource. The client may create such a new resource after the resource was preciously deleted. Schema stored at the client informs the client that any upload of its newly created resource is to be accompanied neither by a resource UID nor by a resource tag. In that both the resource tag and the resource UID are both opaque to the client, the client cannot format or assemble either of these fields. Consequently, when the server receives an uploaded request from the client in which the request itself include neither a resource UID nor a resource tag, schema executed at the server informs the server that the uploaded resource is in fact a new resource. In this circumstance the server will respond by downloading to the client a new resource tag and a new resource UID which the client will cache locally.

When a client does not know the actual name of a resource that the client wants to retrieve from a server, the inventive resource UID technique enables the client to locate and retrieve the resource. To do this, the client uploads a request bearing a resource UID that the client has previously stored in cache. In this situation, the uploaded resource UID from the client is processed by the server to locate a corresponding resource stored at the server that had the same resource UID. When the server has identified the resource that has the same resource UID as that which was uploaded from the client, the server then responds by downloading to the client the correct URL or name of the resource as well as optionally the resource itself if so requested. In turn, the URL and the resource are then cached locally at the client.

Implementation of the resource UID can be such that the resource UID is unique within a particular collection of resources. The resource UID in conjunction with the URL of the collection in which the resource logically resides can be used by a client to refer to and retrieve a current copy of the resource that is stored at a server.

Implementations of the resource UID techniques described herein can allow both client and'server to maintain a unique resource identifier that is independent of various changes to the corresponding resource. Particularly, the resource UID can be independent of changes that are made to the resource on the server, including movement of the resource between servers as well as movement of the resource between collections of resources at the same server.

The implementation of the resource UID can also be such that it is unique across a network. In this implementation, servers in a network maintain an index across all of the resource UIDs. As such, a client can upload a request bearing a resource UID to any server in the network and that server will be capable of accurately processing the request so as to respond by downloading the requested aspects of the requested resource UID to the client. The index of resource UIDs need not be a network-wide index, but is also contemplated to be an index only within given server, or an index within a given store or database (e.g. public and private databases) within a given server, or within only a single collection within a given database within a given server.

When the index of resource UIDs is network-wide, the index can be used by a server in locating the resource independent of which server the resource is stored at, independent of which database on the server that the resource is logically stored in, and will also be independent of which collection of resources that the requested resource is logically stored at the server. Potentially every server can have a list of the resource UID's of the other servers, similar to mapping tables, that it has relationships with so that referrals can be made. As such, the client's resource UID can be uploaded in order to retrieve a resource as a global retrieval across a universe of servers.

The resource UID can be used, in general, in any place a URL can appear in the syntactic dialogue between a client and a server. By formatting the resource UID as proposed herein, standard WebDAV syntactical requirements for URIs are met. One place the resource UID can be used is in the Request URI on a request from a client. Another place the resource UID can be used is in any header that takes a URI, such as the destination header on the MOVE method, of an XML element in the WebDAV protocol. Still another place it can be used is in any XML element in the WebDAV protocol. Also, the resource UID can be used in the body of a request from a client or a response from a server.

In a preferred implementation, a client may include the resource UID in the request header if its intention is to ensure that it is dealing with the exact same resource that it has always known. If a server cannot guarantee the consistency of the UID property when the resource is moved, renamed, or copied, the server may change the resource UID property in those cases without losing all benefits of this invention. Namely, the resource UID may still be useful for identifying the specific resource within its containing collection regardless of deletion and name re-use cases.

The resource tag and the resource UID can be contrasted with an entity tag. The entity tag, referred to herein an "Etag", is fully defined in currently published WebDAV specifications. The Etag differs from each of the previously described resource UID and the resource tag. The Etag is a more specific response from the server than the resource tag that the client downloads from a server. The Etag in the response means that the server sends the actual contents of a resource. Like the resource tag, the Etag is an opaque identifier. When the Etag is used, only the downloaded portion of data in the single request must be exactly the same as the downloaded data previously cached locally at a client. The Etag does not make restrictions on other properties of the resource that are not represented in the downloaded portions, nor does the Etag remain the same if different aspects of the resource are downloaded, e.g. two properties instead of one property.

The function of the Etag is to make network traffic more efficient. For instance, a client can upload a request to a server to get a resource with an Etag. This request is interpreted by the server to send the contents of the resource only if the Etag is not the same. As such, unnecessary downloads to the client are avoided when the server detects an identical Etag. In HTTP, the Etag refers only to the actual response received by a server and does not refer to the data that is stored. As such, the Etag refers to the actual response and the presence of content negotiation based on language or who the client is. Moreover, in HTTP Etags can vary for the GET method in the WebDAV specification for the same resource even if the resource itself has not changed.

In contrast to the Etag, the resource tag actually exposes the data in the resource that was initiated by a request from a client. Further, the inventive use of the resource tag as disclosed herein does not actually synchronize the actual responses gnat are downloaded from a server to a client using the GET method, but rather synchronizes the underlying data in the resource. As such, the invention is not concerned with the synchronization of particular responses returned to a client, but about a client using a resource tag and a GET method in WebDAV protocol to download from a server a copy of the actual data in a resource. When so used, the inventive methods and data structures enable the client to be informed by a server response whether the underlying data in the resource has changed. Unlike the Etag, the resource tag will not return to the client whether a particular response from the server has changed.

An implementation of the inventive resource identifiers described herein allows a client to subscribe to a network such that the client will be notified by a server when a resource or its properties have changed. When such a notification is downloaded to a client, the client can then upload a request to a server to retrieve the changes to the corresponding resource. As such, the network traffic from the subscription client involved and required only one upload from the client to the server rather than a "round trip".

The resource tag and the resource UID are tokens which will preferably have encoded therein an identification of the database of the server on which the corresponding resource originally logically resided. A URL, by way of example and not by way of limitation, is such an identifier that can be encoded into each of these tokens. It is also preferable that the format of the each of these tokens be a binary string that can be used by the client in a compare operation. Being a binary string, these tokens are opaque to a client who is also insensible to the content of these tokens. The opacity of the tokens allows the server to change the format of the tokens at any time, such as by an upgrade, without disturbing interoperability with the client. The client only needs to determine whether the binary number in the token has changed via a compare operation.

Figure 3:
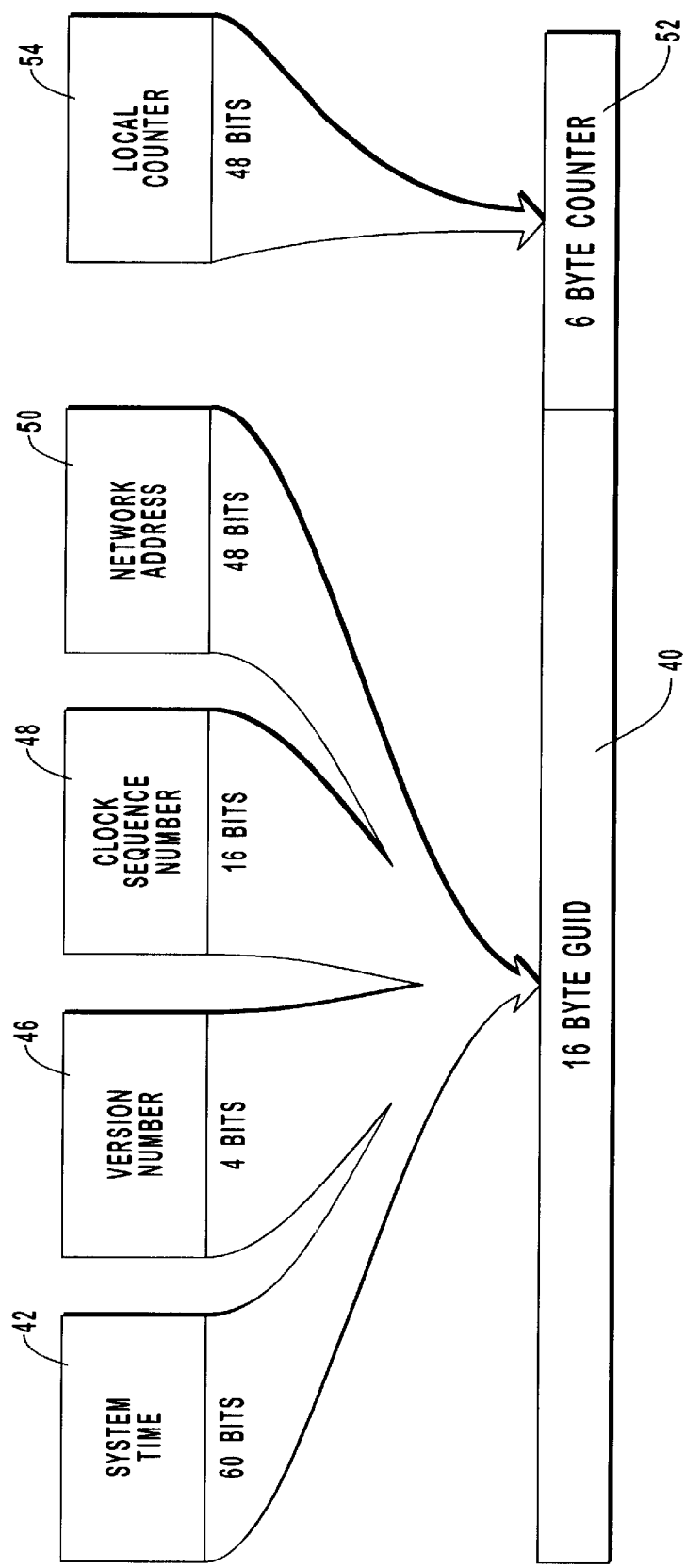
FIG. 3 is a diagram illustrating generation of a Fast Unique Identifier (FUID) that can be used to form a portion of the resource tag and to form the resource UID.

More preferably, each of the tokens includes a 22-byte field referred to herein as a Fast Unique Identifier (FUID). The FUID has a 16-byte GUID field and a 6-byte counter field, both of which are discussed more fully below with respect to FIG. 3. A preferred method of generating a FUID field in the tokens is illustrated in FIG. 3 and discussed below. The FUID preferably comprises a GUID value, which uniquely identifies a database at a server among all other servers in a network, and where the GUID is concatenated with a local counter value. The range of GUID values available must obviously be large enough to uniquely identify the maximum number of databases which will be contained within a network. Preferably, however, the range of GUID values is much, much larger than the maximum number of databases which will be contained within a network. Furthermore, the local counter value is preferably large enough to avoid a short term rollover problem. In the preferred embodiment, the GUID value is 16 bytes long and the local counter value is 6 bytes long for a FUID which is 22 bytes long. FIG. 3 illustrates the various components of the preferred 22 byte FUID.

Focusing first on the 16 byte GUID value, shown in FIG. 3 as 40, an explanation of one preferred method of generating the GUID is presented. First, it should be noted that any method of generating a GUID which uniquely identifies a particular database at a server among all databases in the network can be utilized with this invention and all are examples of a means for generating a globally unique ID. In the preferred embodiment illustrated in FIG. 3, however, the 16 byte GUID value has four components. The first component is a 60 bit system time value. This is illustrated in FIG. 3 as system time block 42. The system time represents the time at which the GUID is generated. In a preferred embodiment, this system time represents the lower most 60 bits of the number of 100 nanosecond intervals since Jan. 1, 1601. Any measure of system time would be acceptable as long as the system time was at least 60 bits long and had sufficient resolution to avoid overlap between successively generated GUID values.

The next component of GUID value 40 is 4 bits of version number. This is illustrated in FIG. 3 by version number block 46. The version number block can be used to identify which version of a GUID generator has generated the current GUID value.

The next component of GUID value 40 is 16 bits of clock sequence number. This is illustrated in FIG. 3 by clock sequence number block 48. The clock sequence number can be a counter which is incremented every time a GUID value is generated by a particular replica node. The purpose of such a counter is to provide a changing component of the GUID value which does not depend on system time. It further serves to randomize the GUID value and ensure that GUIDs generated by individual servers throughout an enterprise are unique with respect to each other. GUIDs generated as disclosed above may be used anytime a unique database ID value is needed.

Finally, the last component of GUID value 40 is 48 bits of network address. This is illustrated in FIG. 3 by network address block 50. The 48 bits of network address are preferably hard coded into the server on the network. Such a network address is often hard coded on a network card which is used to physically connect the server to other servers in the network. Network addresses are typically assigned so that they are unique throughout a network, or at least unique within a site, such as is seen in FIG. 2 at sites 16 and 18.

By combining the above four components (system time, version number, clock sequence number, and network address), a 16 byte value which is unique across the network can be generated. Furthermore, because of the way that FUIDs are generated by concatenating a GUID value with a local counter value, the process of generating GUID values will be used relatively infrequently. In fact, the process will primarily be used when a server is initially connected to the network. Thus, the process of generating GUID values can be a relatively long process since it is used so infrequently. An implementation of a process which generates GUID values as explained above can be obtained from Microsoft Corporation. The implementation resides in the Windows 32 bit software development kit (WIN32SDK) as a program called UUIDGEN.

As a final matter, since the 16 byte GUID value is much larger than the actual number of databases or servers in a network, the 16 byte GUID value can be compressed and stored locally in a shortened form. For example, if there are fewer than 65,536 databases or servers in a network then a table can be created which uses a two byte index value to index a table of 16 byte GUID values. Thus, the storage space required to store individual GUID values can be reduced from 16 bytes each to 2 bytes each (plus the space needed to store the table).

Returning now to FIG. 3, appended to GUID value 40 is a local counter value illustrated as 6 byte counter 52. The length of the counter value is relatively unimportant as long as the length is sufficient to avoid a short term rollover problem. Rollover should be avoided in order to ensure unique ID values. Because GUID values are unique and because the local counter values are only assigned or used once, the entire FUID value is unique. When the counter value does reach its maximum value, reuse of ID values can be prevented by generating a new GUID value and resetting the counter value to zero. As illustrated in FIG. 3, counter value 52 is generated by a local counter illustrated by local counter block 54.

The process of concatenating a local counter value with a GUID value creates many advantages. This method makes it easy to generate large, unique ID values extremely quickly. These values are guaranteed to be unique across an entire network since the GUID value is unique. By using this structure, the server need simply increment the counter each time a unique ID is desired. The process of generating unique IDs can be speeded up even further if the counter value is incremented in blocks so that blocks of unique ID values are allocated. Once a block of ID values has been allocated, they can then be distributed very rapidly from memory without the need to store the counter value in a safe place, such as the local computer disk, between increments in order to prevent loss of the counter value due to an abrupt power or system failure.

Further discussions of the GUID and FUID fields are found in U.S. Pat. No. 5,812,793, issued to Shakib, et al., titled "System and method for asynchronous store and forward data replication", and in U.S. Pat. No. 5,812,773, issued to Norin, titled "System and method for distribution of hierarchically structured data", both of which are incorporated herein by reference and are contemplated as being useful in implementations with the inventive techniques disclosed in the present application.

The resource UID will be preferably be have one (1) FUID that identifies by a GUID the database on the server on which the resource originally logically resided. This GUID of this FUID is concatenated by a 6-byte counter field. The resource tag will preferably be two (2) FUID fields, where the first FUID identifies by a GUID the database on the server on which the resource originally logically resided, and where the GUID of the first FUID is concatenated by a 6-byte counter field. The second FUID identifies by a GUID the database on the server where a specific version of the resource is stored, and where the GUID of the second FUID is concatenated by a 6-byte counter field. The GUIDs in the first and second FUID fields of the resource tag can differ, such as in a circumstance where a first server created and stored a resource and a second server created and stored a modified version of the resource. As used herein, a resource is created or stored in a server or database thereof, include public and/or private databases, when the resource logically resides in the server or database thereof.

The 6-byte counter field in the first FUID in the resource tag is a counter for all of the resources in a database on the server that originally created the resource, and the 6-byte counter field in the second FUID is a counter for all of the changes across the database of the server upon which the specified version of resource logically resides. The incrementing of these 6-byte counter fields can be a simple incrementing, but will preferably be an implementation in which the collection is assigned a specific range and the incrementing of the 6-byte field proceeds within the assigned range for the collection of the respective resource.

The preferred two-FUID embodiment of the resource tag is preferable in that it can be used to identify and locate a resource requested by a client where the requested resource has been deleted from a server on a network. Once deleted, the version number of the last existing version of the resource is no longer accessible. As such, the first FUID can be used by a server to look un the resource on the server on which the requested resource originally logically resided. To do so, the server receiving the upload from the client checks to see if the first FUID of the resource tag has a match at the original server. In this case, the uploaded resource tag from the client identifies to the server the particular server or database thereon that originally stored the resource, as well as identifying to the server the particular version of the resource that that the client had previously downloaded and cached.

FIGS. 4A through 4C and 5A through 5B provide WebDAV examples of the PROPFIND and GET methods in a WebDAV environment. As seen in the example of FIGS. 4A through 4C, a client issues a PROPFIND request to a server in order to retrieve the properties that are defined on a resource held at the server. In FIG. 4A, the client requests the resource UID and resource tag properties from the "microsoft.com" replication name space on each of the resources in the collection "exchange/user0/inbox" on the server "davbuddy1". In FIGS. 4A through 4C, the server sends a response to the client in which the server returns the PROPFIND results as normal. In particular, a schema executing at the server will ensure that the server only returns to the client portions of the resource that the client does not already have the current version of, as well as information about how those items have changed.

The example seen in FIG. 5A and 5B has been redacted to remove much of the technical representations found in typical WebDAV dialogs between client and server and to replace the same with more functionally expressed representations. As seen in the example of FIG. 5A, the client wants to avoid inconsistency while downloading content and properties of a resource. In this example, Client 'A' downloads the contents of a document 'docA' using a GET method is a request. Here, the GET request will cause a server to issue a response that returns the content of document 'docA' and the resource tag of 'docA.'

In FIG. 5B, Client A downloads properties of a document 'docA' using PROPFIND method in a request and includes the resource tag previously obtained in the GET request. The server will process the PROPFIND method in the request only if the resource tag has not changed since the previous GET method request, thus allowing the client to check for consistency between properties and content of the requested resource.

FIG. 6 illustrates an example where a client downloads the contents of a document 'More%20mail.EML' using a GET method in a request that is uploaded to a server from a client. The GET method in the request will cause the server to download to the client a response that returns the content of document 'More%20mail.EML' and that also returns the resource tag of 'More%20mail.EML'. FIG. 6 shows an example of the resource tag as:

"ResourceTag:
<rt:c75196cf3d84174bbc89af0f7d91d5b7
000000001ab2c75196cf3d84174bbc89af0
f7d91d5b70000000034b4>"

Also seen in FIG. 6 is an example of an entity tag (Etag), which is depicted in the WebDAV protocol as a downloaded response from a server. The Etag is a 22-byte file containing a GUID and a 6-byte counter field. In FIG. 6, the field "Etag: "c75196cf3d84174bbc89af0f7d91d5b70000000034b4"" is the entity tag field.

FIGS. 7A and 7B illustrate, respectively, a WebDAV request from a client using a GET method and a WebDAV request from a client using a PROPFIND method. Each request in FIGS. 7A and 7B to be uploaded to a server specifies a resource UID of a particular resource that is stored locally by the client, where the uploaded resource UID is used by the server against a table stored at the server, the table containing a plurality of resource UIDs of resource stored at the server, where table and the uploaded resource UID are used by the server to locate the resource so queried by the client.

4. Resource Tag and UID Implementation Preferences Within WebDAV Protocol

The foregoing inventive techniques relating to the resource tag and the resource UID will preferably be implemented in a DAV Replication model with respect to the methods discussed below to the end that they can be used effectively in such an implementation.

A. General Preferences For The Resource Tag

The use of the resource tag in a WebDAV implementation proposed herein will have certain requirements and preferences. In the preferred WebDAV implementation, the resource tag is to be a token generated by the server that represents the state of a DAV resource (depth=0). A server that implements DAV Replication must be able to generate the resource tag. The server also must provide support for the resource tag property on every replicated DAV resource. The value of this property is a URI.

In a preferred implementation embodiment, the resource tag is required to be opaque to the client and two resource tags are required to be binary comparable by the client. The server is required to guarantee that if two resource tags are the same when compared, then the resource is assured to be the same. In the inventive implementation the client must be able to download the resource tag as a property on the resource. It must be possible for the client to include the resource tag as a condition in a request header of any DAV request. The server must return the resource tag of the resource as a response header in every one of the following method requests: GET, PUT, POST, MKCOL, PROPPATCH, and DELETE. It is preferred that the client keep the resource tag property in a local cache to reflect the state of the resource that is stored in the local cache of the client. A DAV client that wants to avail itself of the server-side conflict detection and resolution mechanism should send its previously obtained resource tag held in local cache in the request headers of the WebDAV method requests GET, PUT, POST, PROPFIND, PROPPATCH, MOVE, COPY, DELETE and MKCOL. A DAV client can use the resource tag property on a resource to detect if it has already obtained the latest version of a specific resource. A DAV client can use resource tag property on a resource to ensure consistency when it uploads or downloads data.

B. PUT Method

The PUT method is used to either add a new non-collection resource to an existing collection or update an existing non-collection resource. The PUT method in DAV Replication context is used to upload the content change for a particular non-collection resource. Every DAV Replication compliant server must return the updated resource tag of the affected non-collection resource in the response headers.

1. Normal PUT Method

If client issues a normal PUT request without any headers specific to replication, then the request will have the default behavior as defined by the currently published HTTP and WebDAV drafts except that a DAV Replication compliant server must return the resource tag (resourcetag) and the resource UID (repl-uid) of the affected resource.

2. PUT Method with Version Checking

Most of the time the client would like to make sure to update the right version of an existing resource, and at the same time the server would like to do conflict detection. If the client has previously downloaded content or properties of a resource, the server must have returned the resource tag of that particular resource. The client may include the resource tag in the request header of a PUT method in the form of If: (<resourcetag>). The client may include the resource UID in the request header of a PUT method in the form of If: (<uid>). The If: (<resourcetag>) or If: (<uid>) condition allows client-initiated conflict detection.

3. PUT Method with Server-side Modifications

Sometimes the PUT method may trigger some server-side action that results in successful overwrite from the client perspective, but modifications or transformations on the server-side resulting in content and/or properties mismatch between the client and server. Since every PUT method must return the updated resource tag, there is mismatch between the content and/or properties on the client and the content and/or properties reflected by the resource tag. In this case the server must return the new status code, 210 Content Different. The response should also include information about what was affected during the execution of the PUT method on the server.

In order to solve this mismatch problem, the client may need to re-fetch the contents and/or properties of the affected resource using the GET and PROPFIND methods.

4. PUT Method to Prevent Inadvertent Overwrite of an Existing Resource

Sometimes the client may want to check if the resource it is intending to PUT already exists, and if so may not want to overwrite the existing contents. In this case the client SHOULD include If-None-Match: * request header in the PUT request so as to avoid overwriting an existing resource.

5. PUT Method with Client-initiated Conflict Detection

The client should include the If: (<resourcetag>) or If: (<uid>) condition in the request header in the PUT request, and update the resource on the server only if the version matches. If the condition fails, then the server must return 412 Precondition Failed error code.

6. PUT Method and Enforcing the Resource Integrity

Consider the following scenario:

Client ZZZ downloads a resource X from a particular collection called docs.

Assume that the URL of the resource is http://www.company.com/docs/X.

Client ZZZ goes offline and makes changes to the resource X.

In the meantime some other client deletes the same resource X and re-creates the resource X on the server.

Now the client comes online and updates the resource X.

This specific scenario may or may not be an error depending on what the client intended in the first place. If the client intended to update the contents of the resource X no matter what, then this is not an error, but if the client intention was to update the contents of the resource X only if it is the same resource it previously downloaded then we have a problem in our hands.

One way to solve this problem is to include the If: (<resourcetag >) or If: (<uid>) condition in the request header to make sure that the client is updating the correct version of a resource. But this may solve the problem only partially because even though the resource tag value is guaranteed to be unique across space and time, it is not enough to distinguish between an updated version of an existing resource and updated version of a new resource with exact same URL.

This specific problem can be only resolved with the addition of the id property on the resource that uniquely identifies a resource. Thus in this scenario, deleting resource X and re-creating resource X in the same collection will result in two different DAV:ids. In effect including both the conditions of resource tag and id, If: (<resourcetag>)(<id>) can solve this problem without any further ambiguity.

C. POST Method

The POST method is used to add a new non-collection resource to an existing collection using a server-defined name. The POST method in DAV Replication context is used to upload the contents of a new resource in a particular collection.

Every DAV Replication compliant server must return the resource tag (resourcetag) and the resource UID (repl-uid) of the new non-collection resource in the response headers.

1. Normal POST Method

If client issues a normal POST request without any headers specific to replication, then the request will have the default behavior as defined by the currently published HTTP and WebDAV drafts except that a DAV Replication compliant server must return the resource tag of any created or updated resource.

A server must ignore any request headers related to resource tag or id for a POST request since they don't hold any special meaning or purpose.

D. PROPPATCH Method

The PROPPATCH method is used to set/remove the properties of an existing DAV resource. PROPPATCH method in the DAV Replication context is used to upload the property changes for a particular DAV resource.

Every DAV Replication compliant server must return the updated resource tag and resource UID of the affected DAV resource in the response headers. The PROPPATCH behavior is very similar to the PUT method behavior except that the PROPPATCH deals with properties rather than the resource contents. Reference is made to section 4(B), supra, for the PUT method for the scenarios.

E. MOVE Method

A client can use the MOVE method to either move an existing DAV resource or rename an existing DAV resource. MOVE method in DAV Replication context is used to upload a move or rename change for a particular DAV resource.

A DAV Replication compliant server must not return any resource tags as a result of the execution of a MOVE operation, and it is the client's responsibility to fetch the resource tag property of the resources at the destination. If the server changes the resource s UID, it must return a resource UID (repl-uid:) header with the new value of the resource UID.

1. MOVE Method with Version Checking

Sometimes the client would like to make sure that it is moving the right version of an existing resource. If the client has previously downloaded content or properties of a resource, the server must have returned the resource tag of that particular resource. Under these circumstances, the client may include the resource tag in the request header of a MOVE method in the form of If: (<resourcetag>) or If: (<uid>).

The If: (<resourcetag>) or If: (<uid>) condition allows client-initiated conflict detection.

2. MOVE Method with Server-side Modifications

Sometimes MOVE method may trigger some server-side action that results in a successful overwrite from client perspective, but modifications or transformations on the server-side resulting in content and/or properties mismatch between the client and server.

In this case the server must return the new status code, 210 Content Different. The response should also include information about what was affected during the execution of the MOVE method on the server.

In order to solve this mismatch problem, the client may need to re-fetch the contents and/or properties of all the affected resources using the GET and PROPFIND methods.

3. MOVE Method to Prevent Inadvertent Overwrite of an Existing Resource

Sometimes the client may want to check if the resource it is intending to MOVE already exists at the destination, and if so the client may not want to overwrite the existing resource.

In this case the client must include a Overwrite: F request header in the MOVE request so as to avoid overwriting an existing resource.

F. COPY Method

A client can use the COPY method to either move an existing DAV resource or rename an existing DAV resource. COPY method in DAV Replication context is used to upload a move or rename change for a particular DAV resource.

A DAV Replication compliant server may not return the resource tag as a result of the execution of a COPY operation, and it is the client's responsibility to fetch the resource tag property of the resources at the destination.

1. COPY Method with Version Checking

Sometimes the client would like to make sure that it is copying the right version of an existing resource. If the client has previously downloaded content or properties of a resource, the server must have returned the resource tag of that particular resource. Under these circumstances, the client may include the resource tag in the request header of a COPY method in the form of If: (<resourcetag >) or If: (<uid>).

The If: (<resourcetag>) or If: (<uid>) condition allows client-initiated conflict detection.

2. COPY Method with Server-side Modifications

Sometimes COPY method may trigger some server-side action that results in successful overwrite from client perspective, but modifications or transformations on the server-side resulting in content and/or properties mismatch between the client and server.

In this case the server must return the new status code, 210 Content Different. The response should also include information about what was affected during the execution of the COPY method on the server.

In order to solve this mismatch problem, the client may need to re-fetch the contents and/or properties of all the affected resources using the GET and PROPFIND methods.

3. COPY Method to Prevent Inadvertent Overwrite of an existing resource

Sometimes the client may want to check if the resource it is intending to COPY already exists at the destination, and if so may not want to overwrite the existing resource.

In this case the client must include Overwrite: F request header in the COPY request so as to avoid overwriting an existing resource.

4. COPY Method with Client-initiated Conflict Detection

The client should include the If: (<resourcetag>) or If: (<uid>) request header for the source collection, source non-collection, destination collection in the COPY request, and move the resource on the server only if the version matches. If the condition fails, then the server must return 412 Precondition Failed error code.

G. MKCOL Method

MKCOL method is used to either add a new collection or a new resource to an existing collection resource. MKCOL method in DAV Replication context is used to upload the creation of a new collection resource. Every DAV Replication compliant server must return the updated resource tag (resourcetag) and resource UID (repl-uid) of the affected collection resource in the response headers.

1. Normal MKCOL Method

If client issues a normal MKCOL request without any headers specific to replication, then the request will have the default behavior as defined by currently published WebDAV specifications except that a DAV Replication compliant server must return the resource tag of the affected resource. MKCOL will fail with 409 Conflict if the client tries to re-create a collection that already exists.

H. GET Method

GET method is used to fetch the contents of an existing DAV resource. GET method in DAV Replication context is used to download the content change for a particular DAV resource. Every DAV Replication compliant server must return the updated resource tag of the affected DAV resource in the response headers.

1. Normal GET Method

If client issues a normal GET request without any headers specific to replication, then the request will have the default behavior as defined by RFC 2068 and currently published WebDAV specifications except that a DAV Replication compliant server must return the resource tag of the affected resource.

2. GET Method with Version Checking

Most of the time the client would like to make sure to fetch the right version of an existing resource. If the client has previously downloaded content or properties of a resource, the server must have returned the resource tag of that particular resource. The client may include the resource tag in the request header of a GET method in the form of If: (<resourcetag>) or If: (<uid>). The If: (<resourcetag >) or If: (<uid>) condition allows client-initiated conflict detection.

3. GET Method with Client-initiated Conflict Detection

The client should include the If: (<resourcetag>) or If: (<uid>) request header in the GET request, and fetch the resource on the server. If the condition fails, then the server must return 412 Precondition Failed error code.

4. GET Method and Enforcing the Resource Integrity

Consider the following scenario:

Client ZZZ downloads a resource X from a particular collection called docs. Assume that the URL of the resource is http:H/www.company.com/dccs/X.

In the meantime some other client deletes the same resource X and re-creates the resource X on the server.

Now the client comes online and downloads the resource X.

This specific scenario may or may not be an error depending on what the client intended in the first place. If the client intended to download the contents of the resource X no matter what, then this is not an error, but if the client intention was to download the contents of the resource X only if it is the same resource it previously downloaded then it has a problem in its hands.

One way to solve this problem is to include the If: (<resourcetag >) or If: (<uid>) condition for the resource to be downloaded in the request header to make sure that the client is fetching the correct version of a resource. But this may solve the problem only partially because even though the resource tag value is guaranteed to be unique across space and time, it is not enough to distinguish between an updated version of an existing resource and updated version of a new resource with exact same URL.

This specific problem can be only resolved with the addition of the resource UID property on the resource that uniquely identifies a resource. Thus in this scenario, deleting resource X and re-creating resource X in the same collection will result in two different resource ids. In effect including both the conditions of resource tag and the resource UID by the entry If: (<resourcetag>) (<uid>) or If: (<uid>) can solve this problem without any further ambiguity.

I. PROPFIND Method

The PROPFIND method is used to fetch the properties of an existing DAV resource. PROPFIND method in DAV Replication context is used to download the property changes for a particular DAV resource. A DAV Replication compliant server must not return the resource tag of the affected resources in the response headers due to the possibility of large result set. However the client may fetch the resource tag as a property of every DAV resource reported in the response of PROPFIND method. Reference is made to section 4(H), supra, in that the GET request scenarios are similar to the PROPFIND scenarios.

J. SEARCH Method

The SEARCH method is used to search the properties of an existing DAV resource. SEARCH method in DAV Replication context is used to search, and download the property changes for DAV resources. SEARCH method must be used to fetch the manifest of a collection or collection hierarchy. For a discussion of the rules the client and server must follow in order to use SEARCH to fetch manifest, reference is made to the patent application titled "Method, Computer Readable Medium, and System for Monitoring the State of a Collection of Resources" which has been incorporated herein by reference.

A DAV Replication compliant server should not return the resource tag of the affected resources in the response headers due to the possibility of large result set. However the client may explicitly fetch the resource tag as a property of every DAV resource reported in the response of SEARCH method. The rest of the SEARCH scenarios follows the PROPFIND scenarios discussed at Section 4(I), supra.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer network system including a server and a plurality of clients each having a local store, wherein the server stores a resource that includes content and properties, a method of enabling a client of the plurality of clients to access the resource, the method comprising the steps of:

transmitting, from the server to the client, a copy of:

the resource as it exists at a selected moment; and
resource status information that represents the status of the resource stored at the server at the selected moment;

said client storing in the local store:
the copy of the resource; and
the resource status information;

said client modifying the copy of the resource stored in the local store;

said client transmitting the modified copy and the resource status information from the client to the server;

the server determining from:
the modified copy of the resource;
the resource as it exists at the selected moment; and
the resource status information from the client;
whether:
the resource stored in the local store of the client has changed; and
the resource stored at the server has changed;
and if the server determines that:
the resource stored at the local store of the client has changed; and
the resource stored at the server has not changed;
then:
said server replacing the resource stored at the server with the modified copy at a new moment;
said server replacing the resource status information stored at the server with a new resource status information at the new moment that represents the new status of the resource;
said server transmitting the new resource status information at the new moment from the server to the client; and
said client replacing the resource status information stored at the client with the new resource status information at the new moment.

2. The method as defined in claim 1, wherein:
transmitting from the server to the client a copy of resource status information that represents the status of the resource stored at the server at the selected moment further comprises:
said server assembling the resource status information that represents the status of the resource stored at the server at the selected moment as a resource tag data structure that includes:
a name of the initial version of the resource; and
a name of a specific version of the resource that logically resides on the server.

3. The method as defined in claim 1, wherein said server replacing the resource status information stored at the server with a new resource status information at the new moment that represents the new status of the new resource further comprises:
said server assembling the new resource status information that represents the new status of the new resource as a resource tag data structure that includes:
a name of the initial version of the resource; and
a name of a specific version of the resource that logically resides on the server.

4. The method as defined in claim 3, wherein:
the name of the initial version of the resource comprises:
a primary field representing the database on the server on which the original version of the resource initially logically resided; and
a secondary field containing a counter for all of the resources in the database on the server on which the original version of the resource initially logically resided; and
the name of the specific version of the resource comprises:
a first field representing the database on the server on which the specific version of the resource logically resides; and
a second field containing a counter for all of the changes across the database of the server upon which the specified version of resource logically resides.

5. The method as defined in claim 2, wherein the name of the specific version of the resource and the name of the initial version of the resource are both binary strings.

6. The method as defined in claim 2, wherein:
the name of the initial version of the resource is a first fast unique ID comprising:
a first globally unique ID which uniquely identifies the database on the server on which the original version of the resource initially logically resided;
a first locally unique ID on the database of the server on which the original version of the resource initially logically resided, said locally unique ID being unique among all other first locally unique IDs, said locally unique ID being concatenated with said first globally unique ID;
the name of the specific version of the resource is a second fast unique ID comprising:
a second globally unique ID which uniquely identifies the database on the server on which the specific version of the resource logically resides; and
a second locally unique ID on the database of the server on which the specific version of the resource logically resides, said second locally unique ID being unique among all other second locally unique IDs, said second locally unique ID being concatenated with said second globally unique ID.

7. The method as defined in claim 2, wherein:
the name of the initial version of the resource is a first FUID comprising:
a first GUID identifying the database of the server on which the original version of the resource initially logically resided; and
a value, concatenated with said first GUID, representing the number of all of the resources in the database on the server on which the original version of the resource initially logically resided;
the name of the specific version of the resource is a second FUID comprising:
a second GUID identifying the database of the server upon which the specific version of the resource logically resides;
a value, concatenated with said second GUID, representing the number of changes across the database of the server upon which the specified version of resource logically resides.

8. The method as defined in claim 7, wherein the first GUID differs from the second GUID.

9. The method as defined in claim 1, wherein:
said client modifying the copy of the resource stored in the local store comprises:
terminating a previously established communication between the client and the server;

creating a new version of the resource and storing the new version in the local store of the client.

10. The method as defined in claim 9, wherein:
said client transmitting the modified copy and the resource status information from the client to the server further comprises establishing a previously terminated communication between the client and the server.

11. The method as defined in claim 1, wherein said client transmitting the modified copy and the resource status information from the client to the server further comprises:
said client assembling a WebDAV protocol request that includes a GET method.

12. In a computer network system including a server and a plurality of clients, wherein the server scores a resource that includes content and properties, a method of enabling a client of the plurality of clients to access the resource, the method comprising the steps of:
said server transmitting from the server to the client:
a first version of the resource as stored at the server; and
resource status information that represents the status of the first version of the resource;
said client storing in a local cache:
a first version of the resource as stored at the server; and
resource status information that represents the status of the first version of the resource;
said server modifying and replacing:
the first version of the resource with a second version of the resource; and
resource status information that represents the status of the first version of the resource with resource status information representing the second version of the resource;
said client transmitting to the server the resource status information that represents the status of the first version of the resource;
the server determining from:
the first version of the resource;
the second version of the resource;
the resource status information that represents the status of the first version of the resource that was transmitted from the client;
whether:
the resource stored at the client has changed; and
the resource stored at the server has changed;
and if the server determines that the first version of the resource has changed:
then:
transmitting from the server to the client the second version of the resource and the resource status information that represents the second version of the resource; and
replacing at the client:
the resource status information that represents the status of the first version of the resource with the resource status that represents the second version of the resource; and
the first version of the resource with the second version of the resource.

13. In a computer network system including a server and a plurality of clients, wherein the server stores a resource that includes content and properties, a method of enabling a client of the plurality of clients to access the resource, the method comprising the steps of;
said server transmitting from the server to the client:
a first version of the resource as stored at the server; and
resource status information that represents the status of the first version of the resource;
said client storing in a local cache:
a first version of the resource as stored at the server; and
resource status information that represents the status of the first version of the resource;
said client changing the first version of the resource stored in the local cache with a second version of the resource;
said server modifying and replacing:
the first version of the resource with a third version of the resource; and
the resource status information that represents the status of the first version of the resource with the resource status information representing the third version of the resource;
said client transmitting to the server the to the server the resource status information that represents the status of the first version of the resource;
said client transmitting to the server the resource status information that represents the status of the first version of the resource;
the client comparing the resource status information that represents the status of the first version with the resource status information that represents the status of the third version to determine that the first and third versions are dissimilar;
said client transmitting a request to the server for:
the third version of the resource;
the resource status information that represents the status of the third version of the resource;
said server transmitting a response to the client that includes:
the third version of the resource;
the resource status information that represents the status of the third version of the resource; and
said client replacing in the local cache:
the resource status information that represents the status of the first version of the resource with the resource status that represents the third version of resource; and
the first version of thee resource with the third version of the resource.

14. A computer program product for implementing, in a server included in a network that also includes a client, a method for synchronizing a copy of a resource that is stored at said client and said server in the network, the computer program product comprising:
a computer-readable medium carrying computer-executable instructions for implementing the method, the computer-executable instructions comprising:
program code means for communicating, from the server to the client, a copy of:
a resource as it exists at a selected moment; and
resource status information that represents the status of the resource stored at the server at the selected moment;
program code means for said client storing in the local store:
the copy of the resource; and
the resource status information;
program code means for said client modifying the copy of the resource stored in the local store;
program code means for said client communicating the modified copy and the resource status information from the client to the server;
program code means for the server determining from:
the modified copy of the resource;
the resource as it exists at the selected moment; and
the resource status information from the client;

whether:
the resource stored in the local store of the client has changed; and
the resource stored at the server has changed;
and if the server determines that:
the resource stored at the local store of the client has changed; and
the resource stored at the server has not changed;
then:
said server replacing the resource stored at the server with the modified copy at a new moment;
said server replacing the resource status information stored at the server with a new resource status information at the new moment that represents the new status of the resource;
said server communicating the new resource status information at the new moment from the server to the client; and
said client replacing the resource status information stored at the client with the new resource status information at the new moment.

15. The computer program product as defined in claim 14, wherein:
communicating from the server to the client a copy of resource status information that represents the status of the resource stored at the server at the selected moment further comprises:
program code means for said server assembling the resource status information that represents the status of the resource stored at the server at the selected moment as a resource tag data structure that includes:
a name of the initial version of the resource; and
a name of a specific version of the resource that logically resides on the server.

16. The computer program product as defined in claim 14, wherein said server replacing the resource status information stored at the server with a new resource status information at the new moment that represents the new status of the new resource further comprises:
program code means for said server assembling the new resource status information that represents the new status of the new resource as a resource tag data structure that includes:
a name of the initial version of the resource; and
a name of a specific version of the resource that logically resides on the server.

17. The computer program product as defined in claim 16, wherein:
the name of the initial version of the resource comprises:
a primary field representing the database on the server on which the original version of the resource initially logically resided; and
a secondary field containing a counter for all of the resources in the database on the server on which the original version of the resource initially logically resided; and
the name of the specific version of the resource comprises:
a first field representing the database on the server on which the specific version of the resource logically resides; and
a second field containing a counter for all of the changes across the database of the server upon which the specified version of resource logically resides.

18. The computer program product as defined in claim 15, wherein the name of the specific version of the resource and the name of the initial version of the resource are both binary strings.

19. The computer program product as defined in claim 49, wherein:
the name of the initial version of the resource is a first fast unique ID comprising:
a first globally unique ID which uniquely identifies the database on the server on which the original version of the resource initially logically resided;
a first locally unique ID on the database of the server on which the original version of the resource initially logically resided, said locally unique ID being unique among all other first locally unique IDs, said locally unique ID being concatenated with said first globally unique ID;
the name of the specific version of the resource is a second fast unique ID comprising:
a second globally unique ID which uniquely identifies the database on the server on which the specific version of the resource logically resides; and
a second locally unique ID on the database of the server on which the specific version of the resource logically resides, said second locally unique ID being unique among all other second locally unique IDs, said second locally unique ID being concatenated with said second globally unique ID.

20. The computer program product as defined in claim 15, wherein:
the name of the initial version of the resource is a first FUID comprising:
a first GUID identifying the database of the server on which the original version of the resource initially logically resided; and
a value, concatenated with said first GUID, representing the number of all of the resources in the database on the server on which the original version of the resource initially logically resided;
the name of the specific version of the resource is a second FUID comprising:
a second GUID identifying the database of the server upon which the specific version of the resource logically resides;
a value, concatenated with said second GUID, representing the number of changes across the database of the server upon which the specified version of resource logically resides.

21. The computer program product as defined in claim 20, wherein the first GUID differs from the second GUID.

22. The computer program product as defined in claim 14, wherein:
said client modifying the copy of the resource stored in the local store comprises:
terminating a previously established communication between the client and the server;
creating a new version of the resource and storing the new version in the local store of the client.

23. The computer program product as defined in claim 22, wherein:
said client communicating the modified copy and the resource status information from the client to the server further comprises program code means for establishing a previously terminated communication between the client and the server.

24. The computer program product as defined in claim 14, wherein said client communicating the modified copy and the resource status information from the client to the server further comprises:

program code means for said client assembling a Web-DAV protocol request that includes a GET method.

25. A computer program product for implementing, in a server included in a network that also includes a client, a method for synchronizing a copy of a resource that is stored at said client and said server in the network, the computer program product comprising:

a computer-readable medium carrying computer-executable instructions for implementing the method, the computer-executable instructions comprising:

program code means for communicating from the server to the client:
a first version of a resource as stored at the server; and
resource status information that represents the status of the first version of the resource;

program code means for said client storing in a local cache:
a first version of the resource as stored at the server; and
resource status information that represents the status of the first version of the resource;

program code means for said server modifying and replacing:
the first version of the resource with a second version of the resource; and
resource status information that represents the status of the first version of the resource with resource status information representing the second version of the resource;

program code means for said client communicating to the server the resource status information that represents the status of the first version of the resource;

program code means for the server determining from:
the first version of the resource;
the second version of the resource;
the resource status information that represents the status of the first version of the resource that was transmitted from the client;

whether:
the resource stored at the client has changed; and
the resource stored at the server has changed;

and if the server determines that the first version of the resource has changed:
then:
communicating from the server to the client the second version of the resource and the resource status information that represents the second version of the resource; and
replacing at the client:
the resource status information that represents the status of the first version of the resource with the resource status that represents the second version of the resource; and
the first version of the resource with the second version of the resource.

26. A computer program product for implementing, in a server included in a network that also includes a client, a method for synchronizing a copy of a resource that is stored at said client and said server in the network, the computer program product comprising:

a computer-readable medium carrying computer-executable instructions for implementing the method, the computer-executable instructions comprising:

program code means for communicating from the server to the client:
a first version of a resource as stored at the server; and
resource status information that represents the status of the first version of the resource;

program code means for said client storing in a local cache:
a first version of the resource as stored at the server; and
resource status information that represents the status of the first version of the resource;

program code means for said client changing the first version of the resource stored in the local cache with a second version of the resource;

program code means for said server modifying and replacing:
the first version of the resource with a third version of the resource; and
the resource status information that represents the status of the first version of the resource with the resource status information representing the third version of the resource;

program code means for said client communicating to the server the resource status information that represents the status of the first version of the resource;

program code means for the server communicating to the client the resource status information that represents the status of the third version of the resource;

program code means for the client comparing the resource status information that represents the status of the first version with the resource status information that represents the status of the third version to determine that the first and third versions are dissimilar, program code means for said client communicating a request to the server for:
the third version of the resource;
the resource status information that represents the status of the third version of the resource; and program code means for said server communicating a response to the client that includes:
the third version of the resource;
the resource status information that represents the status of the third version of the resource;

said client replacing in the local cache:
the resource status information that represents the status of the first version of the resource with the resource status that represents the third version of resource; and
the first version of the resource with the third version of the resource.

* * * * *

UNITED STATES PATENT AND TRADEMARK OFFICE
CERTIFICATE OF CORRECTION

PATENT NO. : 6,578,069 B1
DATED : June 10, 2003
INVENTOR(S) : Alexander I. Hopmann, Rebecca L. Anderson and Brian J. Deen It is certified that error appears in the above-identified patent and that said Letters Patent is hereby corrected as shown below:

Title page,
Item [57], ABSTRACT,
Line 7, change "re connected" to -- reconnected --

Column 1,
Line 23, change "anytime" to -- any time --
Line 53, change "weakness" to --weaknesses--
Line 61, insert -- has altered. -- after "that the client"
Line 62, change "changes" to -- changed --

Column 3,
Line 8, insert -- in -- before "any desired configuration."

Column 4,
Line 2, change "embodiments []of" to -- embodiments of --
Line 33, change ",may" to -- may --

Column 8,
Line 33, change "dater structure" to -data structure-
Llne 34, delete [is] before "logically resides"
Line 39, insert -- , -- after "the collection"
Line 40, change "repeats," to -- repeating, --
Line 49, change "a described" to -- as described --

Column 9,
Line 7, change "iii" to -- in --
Line 24, change "preciously" to -- previously --
Line 32, change "include" to -- includes --
Line 36, insert -- , -- after "new resource UID"
Line 59, change "and'server" to -- and server --

Column 10,
Line 21, insert -- , -- after "relationships with"

Column 11,
Line 14, Change "gnat" to -- that --
Line 65, insert -- , -- after "number of databases"

UNITED STATES PATENT AND TRADEMARK OFFICE
CERTIFICATE OF CORRECTION

PATENT NO.    : 6,578,069 B1
DATED         : June 10, 2003
INVENTOR(S)   : Alexander I. Hopmann, Rebecca L. Anderson and Brian J. Deen It is certified that error appears in the above-identified patent and that said Letters Patent is hereby corrected as shown below:

Column 12,
Line 4, change "22 byte" to -- 22-byte --
Lines 5, 13, 52, 65 and 67, change "16 byte" to -- 16-byte --
Line 14, change "60 bit" to -- 60-bit --

Column 13,
Line 3, change "two byte" to -- two-byte --
Line 4, change "16 byte" to --16-byte --
Line 37, change "Shakib, et al., "to -- Shakib et al., --
l.ine 45, change "be preferably be" to -- preferably --

Column 14,
Line 15, change "un" to -- up --
Line 22, insert -- , -- after "as well as"

Column 15,
Line 22, change "4. Resource Tag..."to-- 1. Resource Tag --
Line 41, change "binary comparable" to -- binary-comparable --
Line 44, insert -- ; -- after "inventive implementation"

Column 17,
Line 13, insert -- the -- before "exact same URL."
Line 16, insert -- , -- after "Thus"
Line 18, insert -- , -- after "In effect"
Line 19, Insert -- , -- after "(<id>)"
Line 62, change "resource s UID" to -- resource UID --

Column 18,
Line 10, insert -- the -- after "Sometimes"
Lines 27, insert -- ; -- after "In this case"
Line 56, insert -- , -- after "In this case"

Column 19,
Line 59, change "/dccs/X" to -- /docs/X --

UNITED STATES PATENT AND TRADEMARK OFFICE
CERTIFICATE OF CORRECTION

PATENT NO. : 6,578,069 B1
DATED : June 10, 2003
INVENTOR(S) : Alexander I. Hopmann, Rebecca L. Anderson and Brian J. Deen It is certified that error appears in the above-identified patent and that said Letters Patent is hereby corrected as shown below:

Column 20,
Line 12, insert -- the -- before "exact same URL."
Line 15, insert -- , -- after "Thus"
Line 17, Insert -- ,-- after "In effect"
Line 43, change "Resources" " to -- Resources," --
Line 47, insert -- , -- after "However"

Column 24,
Lines 14-16, delete duplicate paragraph beginning with "said client transmitting to the server the to the server the..."
Line 39, change "thee" to -- the --

Signed and Sealed this

Twenty-fourth Day of August, 2004

JON W. DUDAS
*Director of the United States Patent and Trademark Office*